(12) United States Patent
Hallock et al.

(10) Patent No.: US 11,642,992 B1
(45) Date of Patent: May 9, 2023

(54) SINGLE MOTOR, DUAL FLUID SYSTEM FOR A VEHICLE SEAT ASSEMBLY

(71) Applicant: LEAR CORPORATION, Southfield, MI (US)

(72) Inventors: Joshua Hallock, Warren, MI (US); David Abdella, Royal Oak, MI (US); Samuel Blair, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/703,250

(22) Filed: Mar. 24, 2022

(51) Int. Cl.
*B60N 2/56* (2006.01)
*B60N 2/66* (2006.01)

(52) U.S. Cl.
CPC ........... *B60N 2/5657* (2013.01); *B60N 2/665* (2015.04)

(58) Field of Classification Search
CPC ........ B60N 2/665; B60N 2/5657; B60N 2/56; A47C 21/042; A47C 21/048
See application file for complete search history.

(56) References Cited

U.S. PATENT DOCUMENTS

| | | | |
|---|---|---|---|
| 5,902,014 A | 5/1999 | Dinkel et al. | |
| 8,933,599 B2 * | 1/2015 | Tsuge | H02K 9/06 310/59 |
| 9,121,414 B2 | 9/2015 | Lofy et al. | |
| 9,452,699 B2 | 9/2016 | Ishii et al. | |
| 10,219,323 B2 | 2/2019 | Inaba et al. | |
| 10,648,464 B2 | 5/2020 | Fitzpatrick et al. | |
| 11,240,883 B2 | 2/2022 | Inaba et al. | |
| 2012/0019084 A1 * | 1/2012 | Tsuge | H02K 9/06 310/59 |
| 2015/0375865 A1 * | 12/2015 | Fischer | B60N 2/22 701/49 |
| 2022/0055512 A1 * | 2/2022 | Zhang | B60N 2/7088 |

FOREIGN PATENT DOCUMENTS

| | | |
|---|---|---|
| CN | 110805554 A | 2/2020 |
| CN | 215979809 U | 3/2022 |
| DE | 102017208134 A1 | 11/2018 |
| KR | 101039349 B1 | 6/2011 |

* cited by examiner

*Primary Examiner* — Shin H Kim
(74) *Attorney, Agent, or Firm* — Brooks Kushman P.C.

(57) ABSTRACT

A motor assembly for a vehicle seat assembly is provided with an electric motor having a motor shaft for rotation in a first direction and a second direction opposite to the first direction, a first fluid transfer device driven by the motor shaft to provide fluid flow therefrom, a one-way clutch assembly driven by the motor shaft, and a second fluid transfer device driven by the motor shaft via the clutch assembly to provide fluid flow therefrom when the clutch assembly is engaged. The second fluid transfer device is decoupled from the motor shaft when the clutch assembly is disengaged. A seat assembly having the motor assembly, and a method of controlling the seat assembly are also provided.

20 Claims, 4 Drawing Sheets

SINGLE MOTOR, DUAL FLUID SYSTEM FOR A VEHICLE SEAT ASSEMBLY

TECHNICAL FIELD

Various embodiments relate to a vehicle seat assembly with more than one air system.

BACKGROUND

Vehicle seat assemblies may be provided with air systems for seat ventilation, massage or lumbar bladders, or other seat functions. Examples of vehicle seat assemblies with air systems may be found in U.S. Pat. Nos. 11,240,883, 9,452,699, and 5,902,014.

SUMMARY

In an embodiment, a seat assembly is provided with a seating component having a first duct and a second duct. An electric motor is supported by the seating component, with the electric motor having a motor shaft for rotation in a first direction and a second direction opposite to the first direction. A first fluid transfer device is driven by the motor shaft, wherein the first fluid transfer device provides air flow to the first duct when the motor shaft rotates in the first direction. A one-way clutch assembly is driven by the motor shaft. A second fluid transfer device is driven by the motor shaft via the clutch assembly, wherein the second fluid transfer device provides air flow to the second duct when the clutch assembly is engaged.

In a further embodiment, the clutch assembly is engaged in response to rotation of the motor shaft in the first direction, and the clutch assembly is disengaged in response to rotation of the motor shaft in the second direction. The second fluid transfer device is decoupled from the motor shaft when the clutch assembly is disengaged.

In another further embodiment, the first fluid transfer device provides air flow to the first duct when the motor shaft rotates in the second direction.

In a further embodiment, a second one-way clutch assembly is driven by the motor shaft, the first fluid transfer device driven by the motor shaft via the second clutch assembly. The first fluid transfer device provides air flow to the first duct when the second clutch assembly is engaged. The first clutch assembly is engaged in response to rotation of the motor shaft in the first direction, and is disengaged in response to rotation of the motor shaft in the second direction. The second clutch assembly is engaged in response to rotation of the motor shaft in the second direction, and is disengaged in response to rotation of the motor shaft in the first direction.

In another further embodiment, the second fluid transfer device has a first engagement member, and the clutch assembly has a second engagement member to cooperate with the first engagement member to engage the clutch assembly such that the motor drives the second fluid transfer device.

In a yet further embodiment, the clutch assembly is provided with a clutch arm supported by the motor shaft for radial movement relative thereto, with the clutch arm defining the second engagement member. A guiding plate is connected to the motor shaft for rotation therewith, with the guiding plate defining a slot extending radially outwardly from a first end to a second end. A clutch plate is supported by the motor shaft for rotation relative thereto, with the clutch plate defining a guide, and the clutch arm supported for translation on the guide. The clutch arm further defines a follower received within the slot.

In an even yet further embodiment, in response to the motor shaft rotating in the first direction, the guiding plate is rotated by the motor shaft relative to the clutch plate, the clutch arm is moved radially outwardly and the follower slides in the slot towards the second end of the slot, and the first and second engagement members engage one another such that the clutch assembly is engaged.

In another even yet further embodiment, in response to the motor shaft rotating in the second direction, the guiding plate is rotated by the motor shaft relative to the clutch plate, the clutch arm is moved radially inwardly and the follower slides in the slot towards the first end of the slot, and the first and second engagement members are spaced apart from one another such that the clutch assembly is disengaged. The guiding plate defines a protrusion extending radially inwardly into the slot adjacent to the first end, and the protrusion prevents the follower from moving towards the second end of the slot while the motor shaft is rotating in the second direction.

In an even yet further embodiment, the second fluid transfer device has an impeller, with the impeller defining a series of internal teeth as the first engagement member. The clutch arm defines a series of external teeth as the second engagement member.

In another yet further embodiment, the clutch assembly is provided with a first permanent magnet member connected to the motor shaft for rotation therewith, a second permanent magnet member supported by the motor shaft and having a defined range of rotational motion relative to the motor shaft, a sleeve extending about an outer perimeter of the second magnet member, and a ferrous metal element supported by an impeller of the second fluid transfer device, the ferrous metal element providing the first engagement member. The first and second magnet members cooperate to provide the second engagement member.

In an even yet further embodiment, the defined range of rotational motion is one-hundred and eighty degrees.

In another even yet further embodiment, in response to the motor shaft rotating in the first direction, the second magnet member is rotated to a first end of the defined range of rotational motion such that corresponding polarities of the first and second magnet members overlap one another and the first and second magnet members then rotate in unison about the motor shaft such that the first engagement member is magnetically coupled to and driven by the second engagement member and the clutch assembly is engaged.

In an even yet further embodiment, in response to the motor shaft rotating in the second direction, the second magnet member is rotated to a second end of the defined range of rotational motion such that corresponding polarities of the first and second magnet members are opposite to one another and the first and second magnet members then rotate in unison about the motor shaft such that the first engagement member is magnetically decoupled from the second engagement member and the clutch assembly is disengaged.

In a further embodiment, the first fluid transfer device is one of a fan and an air pump, and the second fluid transfer device is one of a fan and an air pump.

In another further embodiment, the seating component defines a series of seat ventilation apertures extending through a seating surface of the seating component, with the first duct in fluid communication with the series of seat ventilation apertures to provide flow therethrough.

In a further embodiment, an air bladder is supported by the seating component, with the second duct in fluid communication with the air bladder for inflation thereof.

In another embodiment, a motor assembly for a vehicle seat assembly is provided. The motor assembly is provided with an electric motor having a motor shaft for rotation in a first direction and a second direction opposite to the first direction. A first fluid transfer device is driven by the motor shaft to provide fluid flow therefrom. A one-way clutch assembly is driven by the motor shaft. A second fluid transfer device is driven by the motor shaft via the clutch assembly to provide fluid flow therefrom when the clutch assembly is engaged. The second fluid transfer device is decoupled from the motor shaft when the clutch assembly is disengaged.

In a further embodiment, the second fluid transfer device defines a first engagement member. The clutch assembly is provided with a clutch arm supported by the motor shaft for radial movement relative thereto, with the clutch arm defining a second engagement member to cooperate with the first engagement member to engage the clutch assembly such that the motor drives the second fluid transfer device. The clutch assembly is also provided with a guiding plate connected to the motor shaft for rotation therewith, with the guiding plate defining a slot extending radially outwardly from a first end to a second end, and a clutch plate supported by the motor shaft for rotation relative thereto. The clutch plate defines a guide, and the clutch arm supported for translation on the guide. The clutch arm further defines a follower received within the slot. In response to the motor shaft rotating in the first direction, the guiding plate is rotated by the motor shaft relative to the clutch plate, the clutch arm is moved radially outwardly and the follower slides in the slot towards the second end of the slot, and the first and second engagement members engage one another such that the clutch assembly is engaged. In response to the motor shaft rotating in the second direction, the guiding plate is rotated by the motor shaft relative to the clutch plate, the clutch arm is moved radially inwardly and the follower slides in the slot towards the first end of the slot, and the first and second engagement members are spaced apart from one another such that the clutch assembly is disengaged.

In another further embodiment, the clutch assembly is provided with a first permanent magnet member connected to the motor shaft for rotation therewith, a second permanent magnet member supported by the motor shaft and having a defined range of rotational motion relative to the motor shaft, a sleeve extending about an outer perimeter of the second magnet member, and a ferrous metal element supported by an impeller of the second fluid transfer device. In response to the motor shaft rotating in the first direction, the second magnet member is rotated to a first end of the defined range of rotational motion such that corresponding polarities of the first and second magnet members overlap one another and the first and second magnet members then rotate in unison about the motor shaft such that the ferrous metal element is magnetically coupled to and driven by the first and second permanent magnet members and the clutch assembly is engaged. In response to the motor shaft rotating in the second direction, the second magnet member is rotated to a second end of the defined range of rotational motion such that corresponding polarities of the first and second magnet members are opposite to one another and the first and second magnet members then rotate in unison about the motor shaft such that the ferrous metal element is magnetically decoupled from the first and second permanent magnet members and the clutch assembly is disengaged.

In yet another embodiment, a method of controlling a vehicle seat assembly is provided. A first fluid transfer device is driven by a motor shaft rotating in a first direction such that the first fluid transfer device provides fluid flow to a first duct supported by the vehicle seat assembly. A one-way clutch assembly is engaged by rotating the motor shaft in the first direction. A second fluid transfer device is driven by the motor shaft rotating in the first direction via the engaged one-way clutch assembly such that the second fluid transfer device provides fluid flow to a second duct supported by the vehicle seat assembly. The clutch assembly is disengaged by rotating the motor shaft in a second direction opposite to the first direction such that the second fluid transfer device is decoupled from the motor shaft and is inoperative.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
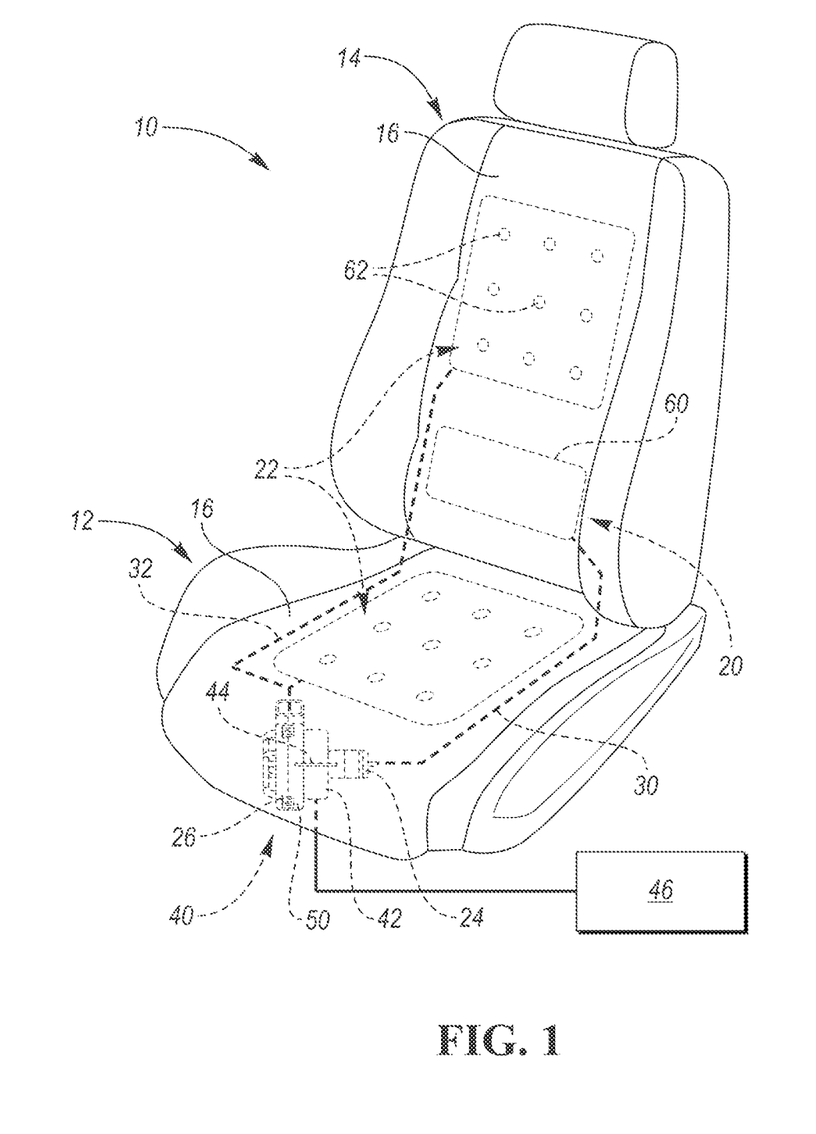
FIG. 1 illustrates a perspective schematic view of a vehicle seat assembly according to an embodiment.

FIG. 1 illustrates a schematic perspective view of a seat assembly 10. The seat assembly 10 may be used in a vehicle as a vehicle seat assembly, for example, in a front row, or second or rear row of seating. The vehicle seat assembly 10 has one or more seating components, such as a seat base 12 or seat cushion, and a seat back 14. Each of the seating components 12, 14 may be provided with a seating surface 16. Each of the seating components may include a frame, as well as cushioning material, a trim cover, and the like.

The seat assembly 10 may be provided with various features and functions. In one example, the seat assembly has a first fluid system 20 and a second fluid system 22. The first and second fluid systems 20, 22 may be independent of one another. As used herein, fluid may refer to a gas, such as air, or a liquid. A fluid system 20, 22 may provide a massage function, for example via bladders positioned within the seating component(s); a lumbar control function with one or more bladders positioned within the seating component(s); other seat position controls with bladders appropriately positioned in the seating component(s); or a ventilation system with apertures provided through the seating surface and trim cover to provide air flow to the seat occupant. In other examples, the fluid systems may be used for other seat functions and/or features as are known in the art.

Each fluid system 20, 22 is provided with an associated fluid transfer device, such that there is a first fluid transfer device 24, and a second fluid transfer device 26 as shown in FIG. 1. The fluid transfer device may be a pump, an air pump, a fan, a blower, a compressor, or another rotary input device to provide flow of a fluid. Each fluid transfer device may include an impeller or similar component that is rotated to provide fluid flow. The first fluid transfer device 24 is in fluid communication with a first duct 30 supported by the seating component to provide fluid flow to the first duct and associated first fluid system 20. The second fluid transfer device 26 is in fluid communication with a second duct 32 supported by the seating component to provide fluid flow to the second duct and associated second fluid system 22. The first and second ducts 30, 32 may be provided in the same seating component, in both seating components, or in different seating components than one another.

In the example shown, the seat assembly 10 has a motor assembly 40 that has a single electric motor 42 with an output shaft. The motor 42 may be controlled to rotate the motor shaft 44 in a first direction or in a second direction opposite to the first direction, e.g. clockwise or counterclockwise, or forward or reverse. A motor controller 46 may be provided to control the direction and/or speed of the motor 42 based on an input to the controller 46 regarding operation of the first fluid system 20 or second fluid system 22. The input may be provided based on a request from the occupant. The motor assembly 40 may additionally include the first and second fluid transfer devices 24, 26.

The motor shaft 44 is connected to the first fluid transfer device 24 and the second fluid transfer device 26 to drive the first and second fluid transfer devices. A one-way clutch assembly 50 is provided in the motor assembly, and in one example, may be integrated into the housing of the second fluid transfer device 26. In a further example, and as described below with reference to FIG. 7, the motor assembly 40 may be provided with a one-way clutch assembly 50 for each of the fluid transfer devices, therefore having two one-way clutch assemblies. The clutch assembly 50 is described below in greater detail and according to various embodiments. The clutch assembly 50 is either in an engaged state or a disengaged state, with the clutch assembly 50 mechanically coupling the motor shaft 44 with the associated fluid transfer device 26 in the engaged state, and mechanically disconnecting or decoupling the motor shaft 44 from the associated fluid transfer device 26 in the disengaged state. The one-way clutch assembly 50 may operate as a momentum or acceleration based clutch, and furthermore may be silent when disengaged.

The first fluid transfer device 24 is driven by the motor shaft 44, and provides air flow to the first duct 30 when the motor shaft 44 rotates in the first direction. In one example, the first fluid transfer device 24 is connected for rotation with the motor shaft 44. The first fluid transfer device 24 may be driven by the motor shaft 44 rotating in either the first or second direction, and furthermore, may provide fluid flow to the first duct 30 regardless of the direction of rotation of the motor shaft 44. In this case, a valve element (not shown) may be provided in the first fluid system 20 to control fluid flow in the first system, and control the function of the first fluid system 20, e.g. by venting fluid flow to atmosphere when there is no demand for flow from the first fluid transfer device 24.

The second fluid transfer device 26 is driven by the motor shaft 44 via the one-way clutch assembly 50. The second fluid transfer device 26 provides fluid flow to the second duct 32 when the clutch assembly 50 is engaged. According to an example, the clutch assembly 50 is engaged in response to rotation of the motor shaft 44 in the first direction such that the second fluid transfer device 26 provides fluid flow to the second duct 32. The clutch assembly 50 is disengaged in response to rotation of the motor shaft 44 in the second direction such that the second fluid transfer device 26 is decoupled from the motor shaft 44 and does not provide fluid flow to the second duct 32, e.g. the second fluid system 22 is inoperative or off.

According to one example, the motor assembly 40 as shown in FIG. 1 is provided with the first fluid transfer device 24 as an air pump to provide fluid flow to at least one bladder 60 supported by the seating component via the first duct 30 of the first fluid system 20 for inflation of the bladder. Air flow to the at least one bladder 60, as well as deflation of the bladder may be controlled via one or more valve assemblies. The second fluid transfer device 26 is a fan to provide fluid flow to a series of seat ventilation apertures 62 extending through one or more seating surfaces of the seating component via the second duct 32. The motor 42 and motor shaft 44 direction may be controlled by the controller 46 to selectively engage the clutch assembly 50 and operate the second fluid transfer device 26 to provide ventilation air flow.

In other examples, the motor assembly 40 may be provided with other fluid transfer devices as the first and second fluid transfer devices, and may be used with other fluid systems of the seat assembly 10.

Figure 2:
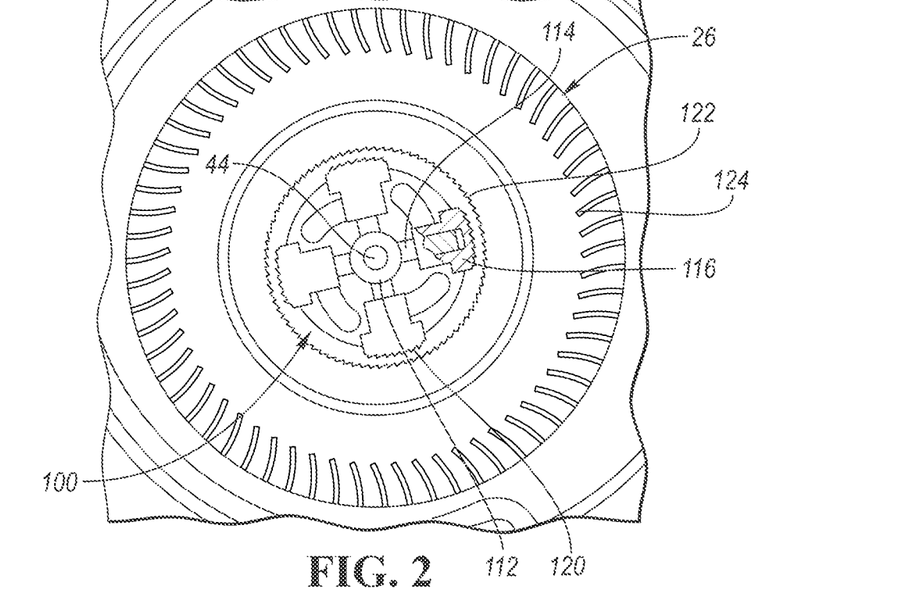
FIG. 2 illustrates a first partial view of a clutch assembly according to an embodiment and for use with the motor assembly and vehicle seat assembly of FIG. 1.
Figure 3:
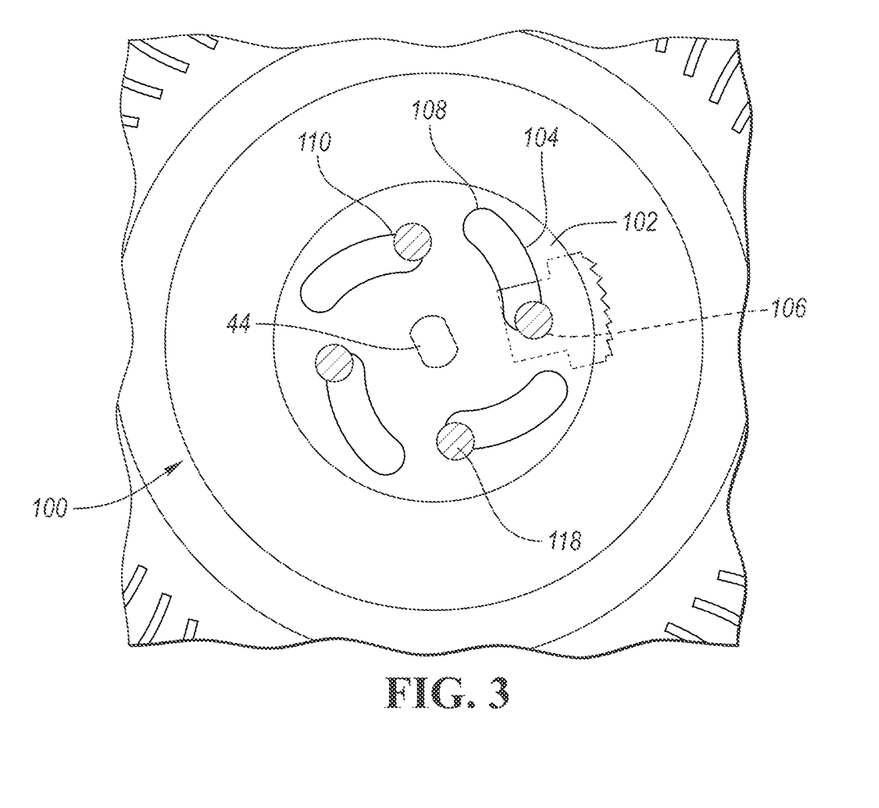
FIG. 3 illustrates a second partial view of the clutch assembly of FIG. 1.

FIGS. 2-3 illustrate a partial view of a one-way clutch assembly 100 according to an embodiment and for use with the motor assembly 40 and seat assembly 10 of FIG. 1. The clutch assembly 100 may be used as clutch assembly 50 as described above. Elements that are the same as or similar to those described above with respect to FIG. 1 are given the same reference number.

The clutch assembly 100 has a guiding plate 102 connected to the motor shaft 44 for rotation therewith. The guiding plate 102 therefore rotates at the same speed as the motor shaft 44 and is fixed to it, e.g. via splines, a keyway, or the like. The guiding plate 102 defines slots 104 that extending radially outwardly from a first end 106 to a second end 108. The slots 104 also extend angularly across the guiding plate 102, with the first and second ends 106, 108 being along different radials of the guiding plate 102. The guiding plate 102 defines a protrusion 110 extending radially inwardly into each slot 104 adjacent to the first end 106. The protrusion 110 extends inwardly into the slot from the outer side of the slot.

A clutch plate 112 is supported by the motor shaft 44 for rotation relative thereto. The clutch plate 112 therefore may rotate freely relative to the motor shaft 44. The clutch plate 112 defines guides 114. In the example shown, the guides 114 extend linearly and radially outwardly from the central axis of the clutch plate 112.

A clutch arm 116 is supported for translation on each guide 114, and is constrained for motion relative to the clutch plate 112 via the associated guide 114. The clutch arm 116 may be constrained for radial movement relative to the guide 114 and the motor shaft 44. One clutch arm 116 is shown in FIG. 2 with a cutaway view to illustrate the guide 114 within the clutch arm 116.

Each clutch arm 116 defines or has a follower 118 that extends outwardly therefrom. The follower 118 is received within an associated slot 104 of the guiding plate 102. The follower 118 may be provided as a pin as shown. The clutch arm 116 also defines an engagement member 120. In one example, and as shown, the engagement member 120 is external teeth on the clutch arm 116.

The second fluid transfer device 26 has or defines another engagement member 122. In one example, and as shown, the second fluid transfer device 26 has an impeller 124, and the impeller 124 defines a series of internal teeth 122 as the another engagement member 122. The second fluid transfer device 26 as shown in FIGS. 2-3 is a fan or blower with an impeller 124; however, in other examples, a pump or other fluid transfer device is also contemplated. The engagement members 120, 122, or teeth, of the clutch arm 116 and the second fluid transfer device 26 cooperate with one another to engage the clutch assembly 100 such that the motor shaft 44 drives the second fluid transfer device 26. According to an example, the engagement members 120, 122, or teeth, are shaped such that they engage only when the motor shaft 44 is rotating in the first direction, or clockwise as shown in FIG. 2.

In response to the motor shaft 44 rotating in the first direction, or clockwise as shown in FIG. 2 and counter-clockwise as shown in FIG. 3, the guiding plate 102 is rotated by the motor shaft 44 relative to the clutch plate 112. As the guiding plate 102 is rotated, the clutch arms 116 are moved radially outwardly, and followers 118 move or slide in their associated slots 104 towards the second ends of the slots 108, where they are maintained based on centrifugal forces on the clutch arms 116. The first and second engagement members 120, 122, or teeth, engage one another such that the clutch assembly 100 is engaged, and the and the second fluid transfer device 26 is driven by the motor shaft 44.

In response to the motor shaft rotating in the second direction, the guiding plate 102 is rotated by the motor shaft 44 relative to the clutch plate 112. As the guiding plate 102 is rotated, the clutch arms 116 are moved radially inwardly and the followers 118 slide in their associated slots 104 towards the first ends of the slots 106. The first and second engagement members 120, 122, or teeth, are spaced apart from one another such that the clutch assembly 100 is disengaged, and the second fluid transfer device 26 is decoupled from and not driven by the motor shaft 44. The protrusions 110 prevent the followers 118 from moving towards the second end 108 of their associated slots 104 while the motor shaft 44 is rotating in the second direction.

Figure 4:
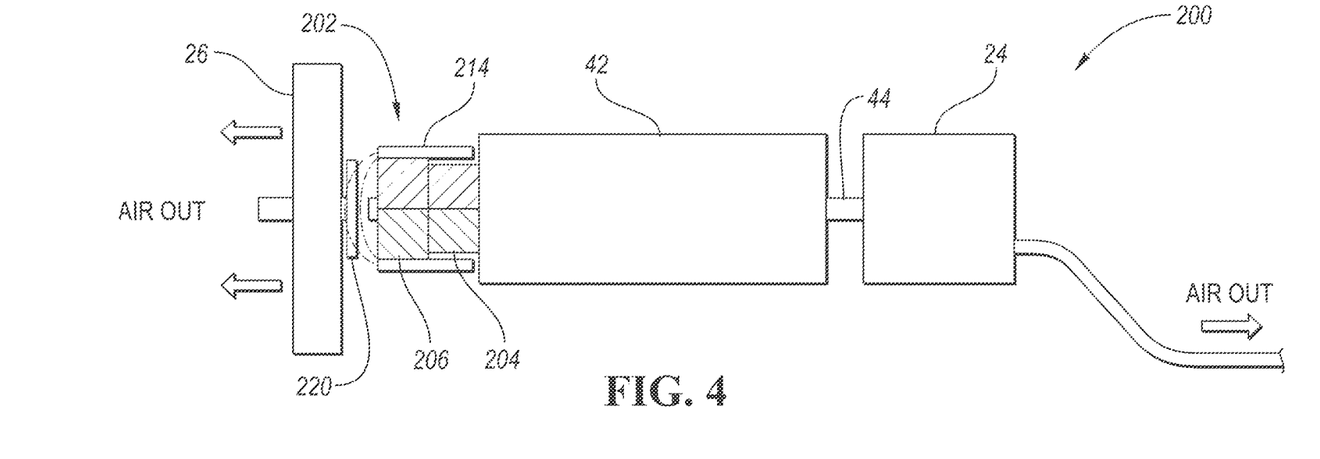
FIG. 4 illustrates a side schematic view of a motor assembly according to another embodiment and for use with the vehicle seat assembly of FIG. 1.

FIG. 4 illustrates another motor assembly 200 for use with the seat assembly of FIG. 1. The motor assembly 200 may be used as motor assembly 40 with respect to FIG. 1. Elements that are the same as or similar to those described above with respect to FIG. 1 are given the same reference number for simplicity.

The first fluid transfer device 24 is connected to the motor shaft 44 for rotation with the motor shaft. The second fluid transfer device 26 is connected to the motor shaft 44 via a one-way clutch assembly 202.

The one-way clutch assembly 202 has a first permanent magnet member 204 connected to the motor shaft 44 for rotation therewith.

Figure 5A:
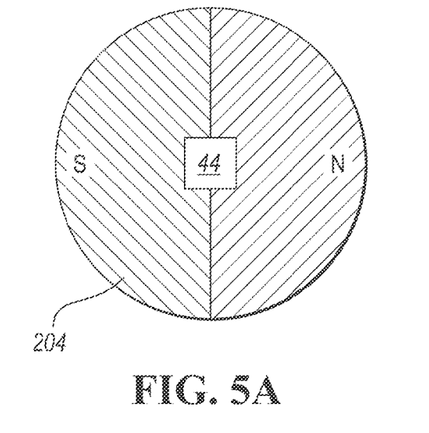
FIGS. 5A and 5B illustrates schematic views of first and second magnet members for use with the motor assembly of FIG. 4 in a first orientation.
Figures 5B, 6B:
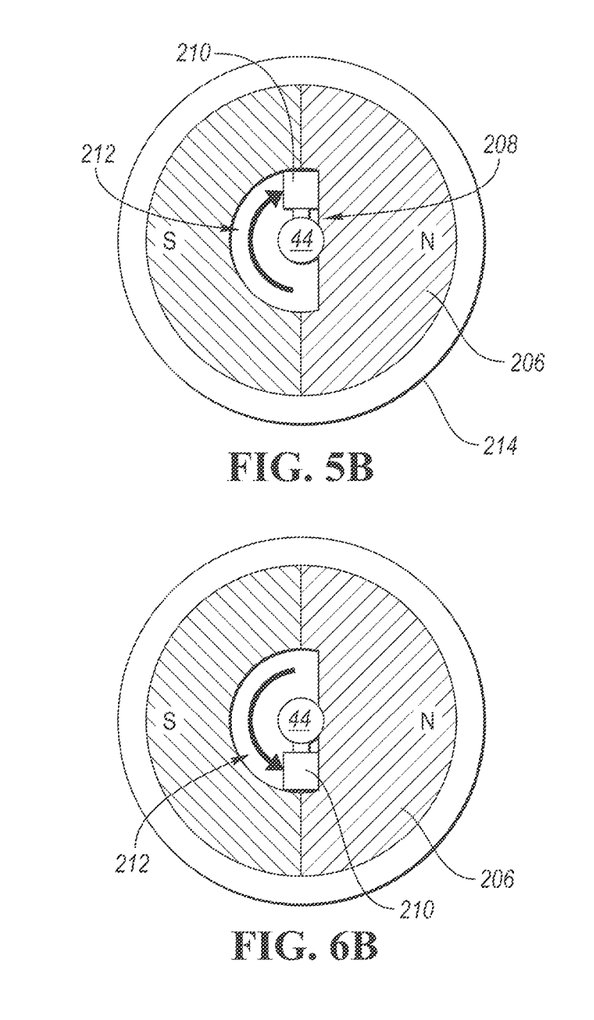
FIGS. 6A and 6B illustrates schematic views of first and second magnet members for use with the motor assembly of FIG. 4 in a second orientation.
Figure 6A:
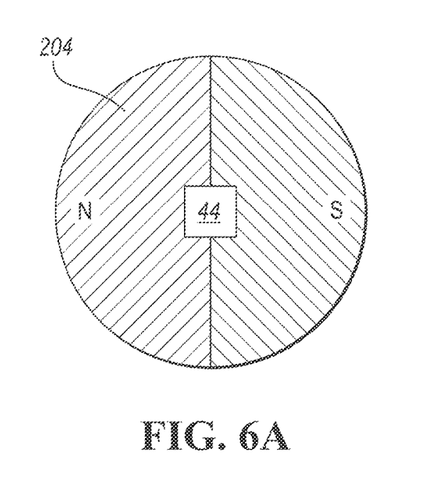

Referring to FIGS. 4-6, the one-way clutch assembly 202 has a second permanent magnet member 206 connected to the motor shaft 44. The second magnet member 206 is connected to the motor shaft 44 via a bearing or bushing such that it may freely rotate relative to the motor shaft 44. Additionally, the motor shaft 44 may include retaining rings or collars on either side of the second magnet member 206 to prevent the second magnet member from walking on the shaft.

The second permanent magnet member 206 may cooperate with a lost motion mechanism 208 to allow a predefined angular range of motion, or defined range of rotational motion, relative to the motor shaft 44. In one example, the defined range of rotational motion is one-hundred and eighty degrees. In other examples, the defined range of rotational motion may be another angular value that is greater than or less than one-hundred and eighty degrees. The motor shaft 44 may therefore rotate relative to the second permanent magnet member 206 through the defined range of rotation motion, or one-hundred and eighty degrees, before the motor shaft 44 begins to rotate the second permanent magnet member 206 based on the lost motion mechanism 208.

According to one non-limiting example, and as shown, the lost motion mechanism 208 has a positioning member 210, or leader, connected to the motor shaft 44 for rotation with the motor shaft. The positioning member 210 may be splined, keyed, or otherwise connected to the motor shaft. The positioning member 210 is received within a recess 212 defined by the second magnet member 206, with the recess 212 extending from a first end to a second end. The recess 212 may be formed as a pocket within the magnet member 206, with a cylindrical hole extending from the pocket through the remainder of the magnet member 206 for the motor shaft 44 to pass through as shown in FIGS. 5B and 6B. In response to the motor shaft 44 rotating in a first direction, the positioning member 210 on the motor shaft 44 rotates relative to the second permanent magnet member 206 and to the first end of the recess 212 in the second magnet member as shown in FIG. 5B. This aligns the north and south poles of the first and second magnet members 204, 206 as shown in FIGS. 5A and 5B, and rotates the second magnet member 206 with the first magnet member 204 with the poles aligned with one another as the motor shaft 44 continues to rotate in the first direction.

In response to the motor shaft 44 rotating in a second direction, the positioning member 210 on the motor shaft 44 rotates relative to the second permanent magnet member 206 to the second end of the recess 212 in the second magnet member as shown in FIG. 6B. This misaligns, or offsets, the north and south poles of the first and second magnet members 204, 206 relative to one another as shown in FIGS. 6A, 6B, and rotates the second magnet member 206 with the first magnet member 204 with the poles of the magnet members offset as the motor shaft 44 continues to rotate in the second direction.

The second permanent magnet member 206 also has a sleeve 214 connected to it and extending about an outer perimeter of the second magnet member. The sleeve 214 may be formed from metal or another material, and acts to add mass or weight to the second magnet member, and provides an increased inertia for the second permanent magnet member. The sleeve 214 additionally may extend to circumferentially around at least a portion of the first magnet member 204, and is spaced apart from the first magnet member 204 as shown in FIG. 4.

The first and second permanent magnet members 204, 206 are each formed from a material that is magnetized and creates its own persistent magnetic field. Each of the first and second permanent magnet members 204, 206 therefore have a north pole and a south pole. According to one example, and as shown in FIGS. 5A, 5B, 6A, and 6B, with end views of the magnet members, the first and second permanent magnet members 204, 206 are each formed as discs, or with a cylindrical shape. Furthermore, the first and second permanent magnet members 204, 206 are each formed such that the north pole forms one semi-cylinder, and the south pole forms the other semi-cylinder. The north and south poles are therefore positioned on either side of a plane containing the axis of rotation of the associated magnet member 204, 206.

The second fluid transfer device 26 defines an engagement member 220. In one example, the engagement member 220 is provided by a ferrous metal element, and may be a ferrous metal disc. The ferrous metal element is attracted to a magnetic field due to its material properties. The engagement member 220 is supported by a rotating element of the second fluid transfer device, e.g. an impeller.

The first and second magnet members 204, 206 cooperate to provide another engagement member based on their position relative to one another. When the first and second magnet members are positioned with the north poles overlapping one another, and with the south poles overlapping one another, as shown in FIG. 4 and FIGS. 5A, 5B a magnetic field is created that attracts the ferrous disc 220 sufficiently to couple the ferrous disc 220 to the rotating first and second magnet members 204, 206, such that the ferrous disc 220 and impeller also rotate, and the clutch assembly 202 is engaged.

When the first and second magnet members 204, 206 are positioned with the north poles misaligned or offset with the south poles, as shown in FIGS. 6A, 6B, the magnet members 204, 206 do not cooperate to provide the magnetic field described above, and the ferrous disc 220 is not sufficiently attracted to the first and second magnet members 204, 206 such that the ferrous disc 220 is not coupled to the rotating first and second magnet members 204, 206. In this case, the ferrous disc 220 and impeller do not rotate with the first and second magnet members 204, 206 and the clutch assembly 202 is disengaged.

As the clutch assembly 202 engagement is based on a solid state or magnetic field, and does not rely on physical engagement of components of a mechanical clutch mechanism, the clutch assembly 202 may result in reduced wear and reduced noise in comparison to a mechanical clutch mechanism.

In operation, and in response to the motor shaft 44 rotating in the first direction, the second magnet member 206 is rotated to a first end of the defined range of rotational motion by the positioning member 210 such that corresponding polarities of the first and second magnet members 204, 206 overlap one another. The first and second magnet members 204, 206 then rotate in unison about the motor shaft 44 and generate a collective magnetic field such that the engagement member 220 is magnetically coupled to and driven by the magnet members 204, 206, and the clutch assembly 202 is engaged. The magnet members 204, 206 therefore may collectively provide an engagement member to cooperate with engagement member 220.

In response to the motor shaft 44 rotating in the second direction, the second magnet member 206 is rotated to a second end of the defined range of rotational motion by the positioning member 210 such that corresponding polarities of the first and second magnet members 204, 206 are opposite to one another. The first and second magnet members 204, 206 then rotate in unison about the motor shaft 44 without generating the collective magnetic field such that the engagement member 220 is magnetically decoupled from the magnet members 204, 206, or the other engagement member and the clutch assembly 202 is disengaged.

Figure 7:
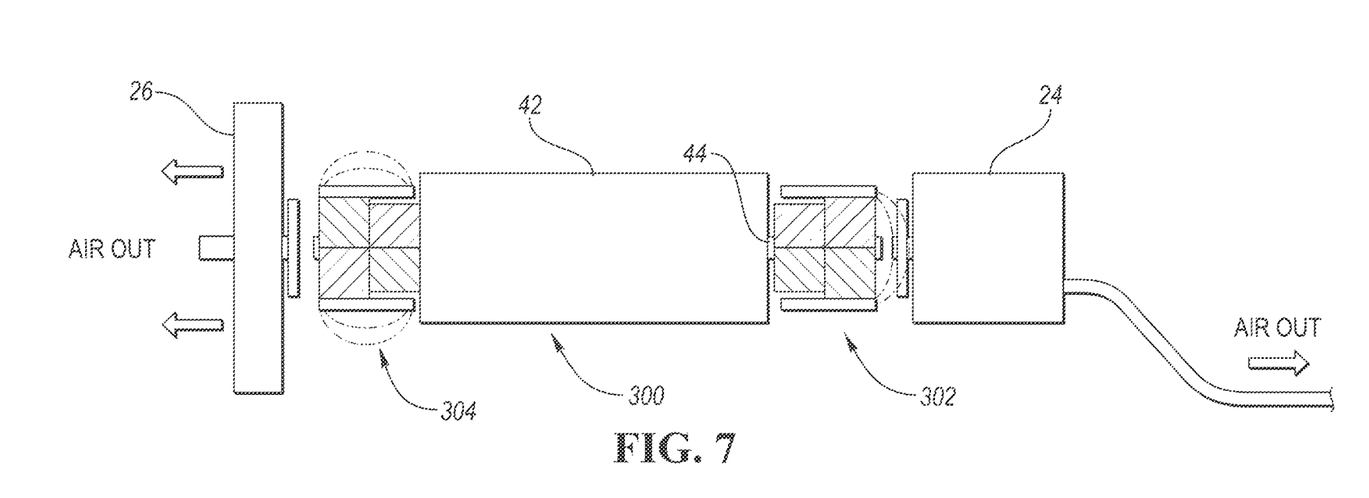
FIG. 7 illustrates a side schematic view of an alternative embodiment of the motor assembly of FIG. 4.

FIG. 7 illustrates a motor assembly 300. Elements that are the same as or similar to those described above with respect to FIGS. 1-6 are given the same reference number for simplicity. The motor assembly 300 is provided with first and second one-way clutch assemblies 302, 304.

The first and second clutch assemblies 302, 304 are each shown as being a clutch assembly 202 as described above with respect to FIGS. 4-6. Although the motor assembly of FIG. 7 is illustrated as having one-way clutch assemblies 302, 304 similar to the clutch assembly 202 described above with respect to FIGS. 4-6, it is also contemplated that the motor assembly could be provided with two clutch assemblies 100 as described above with respect to FIGS. 2-3, or with one clutch assembly 100 of FIGS. 2-3 and one clutch assembly 202 of FIGS. 4-6.

Each one-way clutch assembly 302, 304 is driven by the motor shaft 44, and selectively engages the motor shaft 44 with the associated fluid transfer device 24, 26. Each fluid transfer device 24, 26 is therefore driven by the motor shaft 44 via the associated clutch assembly 302, 304, and provides air flow therefrom when the associated clutch assembly 302, 304 is engaged.

The first clutch assembly 302 is engaged in response to rotation of the motor shaft 44 in the first direction, and is disengaged in response to rotation of the motor shaft 44 in the second direction. The second clutch assembly 304 is engaged in response to rotation of the motor shaft 44 in the second direction, and is disengaged in response to rotation of the motor shaft 44 in the first direction. Therefore, the two clutch assemblies 302, 304 allow for engaging and driving only one fluid transfer device at a time based on the direction of rotation of the motor shaft 44. Note that FIG. 7 illustrates the clutch 302 as being engaged, and the clutch 304 as being disengaged.

According to various embodiments as described above, a method of controlling a vehicle seat assembly 10 is provided. A first fluid transfer device 24 is rotated by a motor shaft 44 rotating in a first direction such that the first fluid transfer device 24 provides fluid flow to a first duct 30 supported by the vehicle seat assembly.

A one way clutch assembly 50 is engaged by rotating the motor shaft 44 in the first direction. A second fluid transfer device 26 is driven by the motor shaft 44 rotating in the first direction via the engaged one way clutch assembly 50 such that the second fluid transfer device 26 provides fluid flow to a second duct 32 supported by the vehicle seat assembly.

The clutch assembly 50 is disengaged by rotating the motor shaft 44 in a second direction opposite to the first direction such that the second fluid transfer device 26 is decoupled from the motor shaft 44 and is inoperative.

Engagement and disengagement of the clutch assembly 50 is therefore controlled via only the direction of the electric motor 42, and a separate control input for the clutch state is not needed.

In a further step, a second one-way clutch assembly 50 may also be provided to connect the motor shaft 44 to the first fluid transfer device 24, similar to that described above with respect to FIG. 7. The second one-way clutch assembly is engaged by rotating the motor shaft 44 in the second direction. A first fluid transfer device 24 is therefore driven by the motor shaft rotating in the second direction via the engaged second clutch assembly such that the first fluid transfer device 24 provides fluid flow to the first duct 30 supported by the vehicle seat assembly. The second clutch assembly is disengaged by rotating the motor shaft 44 in the first direction such that the first fluid transfer device 24 is decoupled from the motor shaft 44 and is inoperative. With two clutch assemblies, only one of the first and second fluid transfer devices 24, 26 is driven by the motor, and the other is decoupled from the motor shaft 44.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A seat assembly comprising:
    a seating component having a first duct and a second duct;
    an electric motor supported by the seating component, the electric motor having a motor shaft for rotation in a first direction and a second direction opposite to the first direction;
    a first fluid transfer device driven by the motor shaft, wherein the first fluid transfer device provides air flow to the first duct when the motor shaft rotates in the first direction;
    a one-way clutch assembly driven by the motor shaft; and
    a second fluid transfer device driven by the motor shaft via the clutch assembly, wherein the second fluid transfer device provides air flow to the second duct when the clutch assembly is engaged.

2. The seat assembly of claim 1 wherein the clutch assembly is engaged in response to rotation of the motor shaft in the first direction;
    wherein the clutch assembly is disengaged in response to rotation of the motor shaft in the second direction; and
    wherein the second fluid transfer device is decoupled from the motor shaft when the clutch assembly is disengaged.

3. The seat assembly of claim 1 wherein the first fluid transfer device provides air flow to the first duct when the motor shaft rotates in the second direction.

4. The seat assembly of claim 1 further comprising a second one-way clutch assembly driven by the motor shaft, the first fluid transfer device driven by the motor shaft via the second clutch assembly, wherein the first fluid transfer device provides air flow to the first duct when the second clutch assembly is engaged;
    wherein the first clutch assembly is engaged in response to rotation of the motor shaft in the first direction, and is disengaged in response to rotation of the motor shaft in the second direction; and
    wherein the second clutch assembly is engaged in response to rotation of the motor shaft in the second direction, and is disengaged in response to rotation of the motor shaft in the first direction.

5. The seat assembly of claim 1 wherein the second fluid transfer device has a first engagement member; and
    wherein the clutch assembly has a second engagement member to cooperate with the first engagement member to engage the clutch assembly such that the motor drives the second fluid transfer device.

6. The seat assembly of claim 5 wherein the clutch assembly comprises:
    a clutch arm supported by the motor shaft for radial movement relative thereto, the clutch arm defining the second engagement member;
    a guiding plate connected to the motor shaft for rotation therewith, the guiding plate defining a slot extending radially outwardly from a first end to a second end; and
    a clutch plate supported by the motor shaft for rotation relative thereto, the clutch plate defining a guide, the clutch arm supported for translation on the guide;
    wherein the clutch arm further defines a follower received within the slot.

7. The seat assembly of claim 6, wherein, in response to the motor shaft rotating in the first direction, the guiding plate is rotated by the motor shaft relative to the clutch plate, the clutch arm is moved radially outwardly and the follower slides in the slot towards the second end of the slot, and the first and second engagement members engage one another such that the clutch assembly is engaged.

8. The seat assembly of claim 6 wherein, in response to the motor shaft rotating in the second direction, the guiding plate is rotated by the motor shaft relative to the clutch plate, the clutch arm is moved radially inwardly and the follower slides in the slot towards the first end of the slot, and the first and second engagement members are spaced apart from one another such that the clutch assembly is disengaged; and
    wherein the guiding plate defines a protrusion extending radially inwardly into the slot adjacent to the first end, wherein the protrusion prevents the follower from moving towards the second end of the slot while the motor shaft is rotating in the second direction.

9. The seat assembly of claim 6 wherein the second fluid transfer device has an impeller, the impeller defining a series of internal teeth as the first engagement member; and
    wherein the clutch arm defines a series of external teeth as the second engagement member.

10. The seat assembly of claim 5 wherein the clutch assembly comprises:
    a first permanent magnet member connected to the motor shaft for rotation therewith;
    a second permanent magnet member supported by the motor shaft and having a defined range of rotational motion relative to the motor shaft;
    a sleeve extending about an outer perimeter of the second magnet member; and
    a ferrous metal element supported by an impeller of the second fluid transfer device, the ferrous metal element providing the first engagement member;
    wherein the first and second magnet members cooperate to provide the second engagement member.

11. The seat assembly of claim 10 wherein the defined range of rotational motion is one-hundred and eighty degrees.

12. The seat assembly of claim 10 wherein in response to the motor shaft rotating in the first direction, the second magnet member is rotated to a first end of the defined range of rotational motion such that corresponding polarities of the first and second magnet members overlap one another and the first and second magnet members then rotate in unison about the motor shaft such that the first engagement member is magnetically coupled to and driven by the second engagement member and the clutch assembly is engaged.

13. The seat assembly of claim 10 wherein in response to the motor shaft rotating in the second direction, the second magnet member is rotated to a second end of the defined range of rotational motion such that corresponding polarities of the first and second magnet members are opposite to one another and the first and second magnet members then rotate in unison about the motor shaft such that the first engagement member is magnetically decoupled from the second engagement member and the clutch assembly is disengaged.

14. The seat assembly of claim 1 wherein the first fluid transfer device is one of a fan and an air pump; and
   wherein the second fluid transfer device is one of a fan and an air pump.

15. The seat assembly of claim 1 wherein the seating component defines a series of seat ventilation apertures extending through a seating surface of the seating component, the first duct in fluid communication with the series of seat ventilation apertures to provide flow therethrough.

16. The seat assembly of claim 1 further comprising an air bladder supported by the seating component, the second duct in fluid communication with the air bladder for inflation thereof.

17. A motor assembly for a vehicle seat assembly, the motor assembly comprising:
   an electric motor having a motor shaft for rotation in a first direction and a second direction opposite to the first direction;
   a first fluid transfer device driven by the motor shaft to provide fluid flow therefrom;
   a one-way clutch assembly driven by the motor shaft; and
   a second fluid transfer device driven by the motor shaft via the clutch assembly to provide fluid flow therefrom when the clutch assembly is engaged, wherein the second fluid transfer device is decoupled from the motor shaft when the clutch assembly is disengaged.

18. The motor assembly of claim 17 wherein the second fluid transfer device defines a first engagement member; and
   wherein the clutch assembly further comprises:
      a clutch arm supported by the motor shaft for radial movement relative thereto, the clutch arm defining a second engagement member to cooperate with the first engagement member to engage the clutch assembly such that the motor drives the second fluid transfer device,
      a guiding plate connected to the motor shaft for rotation therewith, the guiding plate defining a slot extending radially outwardly from a first end to a second end, and
      a clutch plate supported by the motor shaft for rotation relative thereto, the clutch plate defining a guide, the clutch arm supported for translation on the guide,
      wherein the clutch arm further defines a follower received within the slot,
      wherein, in response to the motor shaft rotating in the first direction, the guiding plate is rotated by the motor shaft relative to the clutch plate, the clutch arm is moved radially outwardly and the follower slides in the slot towards the second end of the slot, and the first and second engagement members engage one another such that the clutch assembly is engaged, and
      wherein, in response to the motor shaft rotating in the second direction, the guiding plate is rotated by the motor shaft relative to the clutch plate, the clutch arm is moved radially inwardly and the follower slides in the slot towards the first end of the slot, and the first and second engagement members are spaced apart from one another such that the clutch assembly is disengaged.

19. The motor assembly of claim 17 wherein the clutch assembly comprises:
   a first permanent magnet member connected to the motor shaft for rotation therewith;
   a second permanent magnet member supported by the motor shaft and having a defined range of rotational motion relative to the motor shaft;
   a sleeve extending about an outer perimeter of the second magnet member; and
   a ferrous metal element supported by an impeller of the second fluid transfer device;
   wherein in response to the motor shaft rotating in the first direction, the second magnet member is rotated to a first end of the defined range of rotational motion such that corresponding polarities of the first and second magnet members overlap one another and the first and second magnet members then rotate in unison about the motor shaft such that the ferrous metal element is magnetically coupled to and driven by the first and second permanent magnet members and the clutch assembly is engaged; and
   wherein in response to the motor shaft rotating in the second direction, the second magnet member is rotated to a second end of the defined range of rotational motion such that corresponding polarities of the first and second magnet members are opposite to one another and the first and second magnet members then rotate in unison about the motor shaft such that the ferrous metal element is magnetically decoupled from the first and second permanent magnet members and the clutch assembly is disengaged.

20. A method of controlling a vehicle seat assembly, the method comprising:
   driving a first fluid transfer device by a motor shaft rotating in a first direction such that the first fluid transfer device provides fluid flow to a first duct supported by the vehicle seat assembly;
   engaging a one-way clutch assembly by rotating the motor shaft in the first direction;
   driving a second fluid transfer device by the motor shaft rotating in the first direction via the engaged one-way clutch assembly such that the second fluid transfer device provides fluid flow to a second duct supported by the vehicle seat assembly; and
   disengaging the clutch assembly by rotating the motor shaft in a second direction opposite to the first direction such that the second fluid transfer device is decoupled from the motor shaft and is inoperative.

* * * * *